(12) United States Patent
Johnson et al.

(10) Patent No.: US 9,488,063 B2
(45) Date of Patent: Nov. 8, 2016

(54) CLEARANCE CONTROL SYSTEM FOR A ROTARY MACHINE AND METHOD OF CONTROLLING A CLEARANCE

(71) Applicant: General Electric Company, Schenectady, NY (US)

(72) Inventors: David Martin Johnson, Simpsonville, SC (US); Radu Ioan Danescu, Greer, SC (US)

(73) Assignee: General Electric Company, Schenectady, NY (US)

( * ) Notice: Subject to any disclaimer, the term of this patent is extended or adjusted under 35 U.S.C. 154(b) by 570 days.

(21) Appl. No.: 14/025,179

(22) Filed: Sep. 12, 2013

(65) Prior Publication Data

US 2015/0071767 A1 Mar. 12, 2015

(51) Int. Cl.
*F01D 11/18* (2006.01)
*F01D 11/22* (2006.01)
*F01D 11/24* (2006.01)

(52) U.S. Cl.
CPC ............... *F01D 11/24* (2013.01); *F01D 11/18* (2013.01); *F01D 11/22* (2013.01); *Y02T 50/671* (2013.01)

(58) Field of Classification Search
CPC ........ F01D 11/14; F01D 11/16; F01D 11/18; F01D 11/20; F01D 11/22; F01D 11/24
USPC ...... 415/136, 138, 139, 173.1, 173.2, 173.3, 415/173.4
See application file for complete search history.

(56) References Cited

U.S. PATENT DOCUMENTS

| | | | |
|---|---|---|---|
| 3,867,061 A * | 2/1975 | Moskowitz | F01D 11/127 415/135 |
| 5,219,268 A | 6/1993 | Johnson | |
| 6,702,550 B2 * | 3/2004 | Darkins, Jr. | F01D 9/04 415/116 |
| 7,686,569 B2 * | 3/2010 | Paprotna | F01D 11/20 415/1 |
| 8,292,571 B2 | 10/2012 | Ballard, Jr. et al. | |

FOREIGN PATENT DOCUMENTS

DE     10 2007 056 895 A1 *   5/2009   ............. F01D 11/16

* cited by examiner

*Primary Examiner* — Christopher Verdier
(74) *Attorney, Agent, or Firm* — Ernest G. Cusick; Frank A. Landgraff

(57) ABSTRACT

A clearance control system for a rotary machine includes an outer casing including an outer casing main portion having a first radial thickness, wherein the outer casing is configured to expand at a first time rate of thermal expansion. Also included is an inner casing disposed between the outer casing and a rotary portion, the inner casing including an inner casing main portion having a second radial thickness that is less than the first radial thickness, wherein the inner casing is configured to expand at a second time rate of thermal expansion that is greater than the first time rate of thermal expansion of the outer casing. Further included is an inner casing leg configured to separate from an outer casing leg during expansion of the inner casing and configured to engage the outer casing leg during contraction of the inner casing.

17 Claims, 4 Drawing Sheets

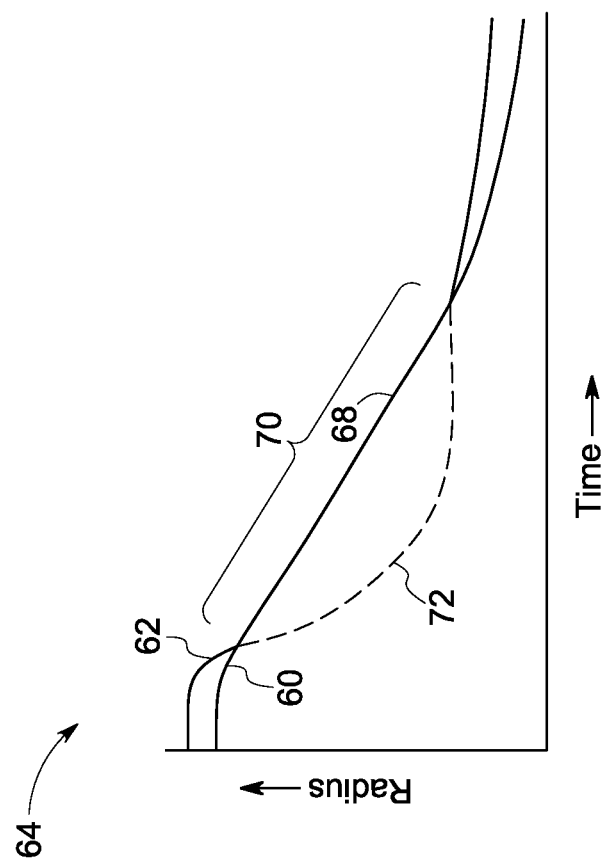
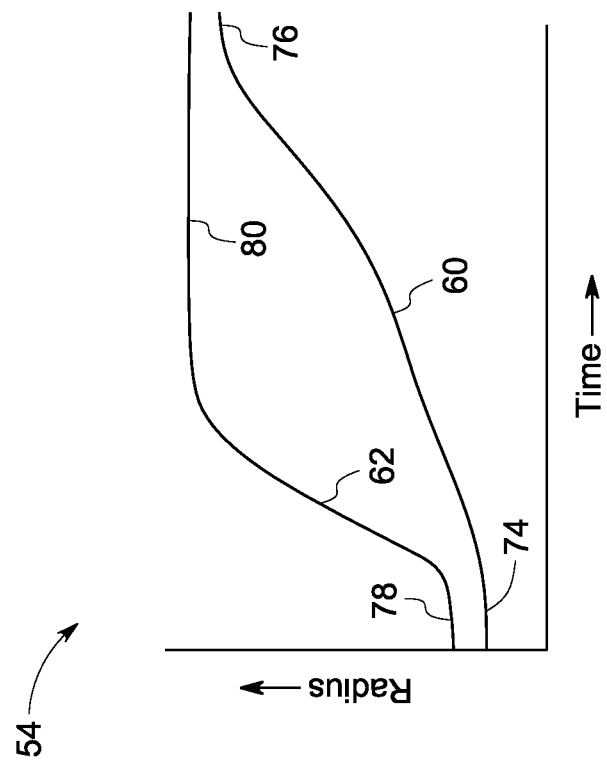

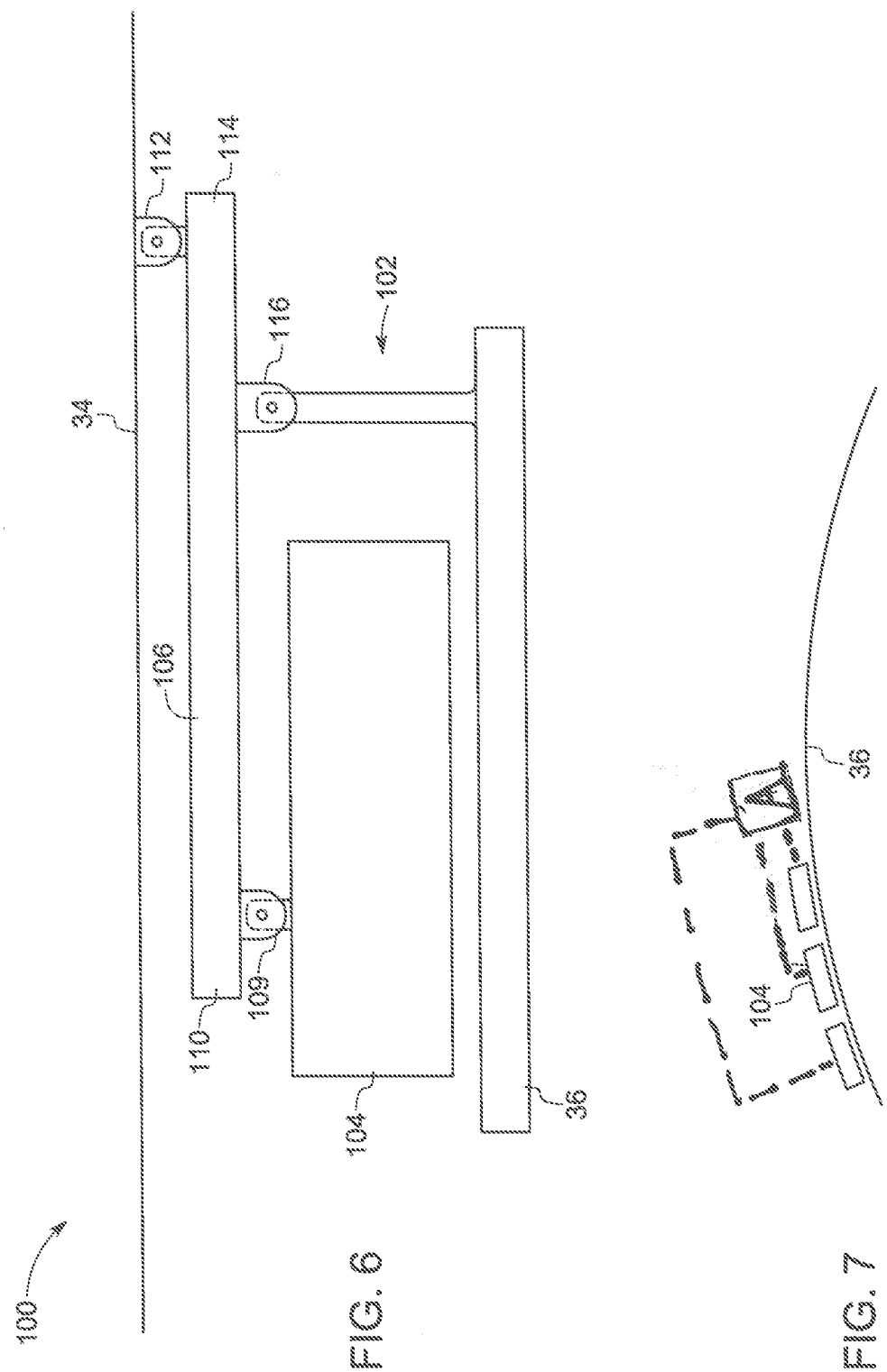

CLEARANCE CONTROL SYSTEM FOR A ROTARY MACHINE AND METHOD OF CONTROLLING A CLEARANCE

BACKGROUND OF THE INVENTION

The subject matter disclosed herein relates to rotary machines, and more particularly to a clearance control system for adjusting the clearance between a stationary component and a rotary component of the rotary machine, as well as a method of adjusting the clearance.

In certain applications, a clearance may exist between components that move relative to one another. For example, a clearance may exist between rotary and stationary components in a rotary machine, such as a compressor, a turbine, or the like. The clearance may increase or decrease during operation of the rotary machine due to temperature changes and other factors. A smaller clearance may improve performance and efficiency in a compressor or turbine, because less working fluid leaks between blades and a surrounding structure, such as a shroud, for example. However, a smaller clearance also increases the potential for a rub condition between the rotary and stationary components. For example, the potential for a rub condition may increase during transient conditions and decrease during steady state conditions. Unfortunately, existing systems do not adequately control clearance in rotary machines. Manipulating the response of surrounding structures include a fast response during startup to avoid rubbing, however, an associated fast response during shutdown may result in rubbing and/or pinching during shutdown or subsequent restart. Conversely, slow responses of the surrounding structures may lead to rubbing and/or pinching during a cold start transient.

BRIEF DESCRIPTION OF THE INVENTION

According to one aspect of the invention, a clearance control system for a rotary machine includes an outer casing including an outer casing main portion having a first radial thickness, wherein the outer casing is configured to expand at a first time rate of thermal expansion. Also included is an inner casing disposed between the outer casing and a rotary portion, the inner casing including an inner casing main portion having a second radial thickness that is less than the first radial thickness, wherein the inner casing is configured to expand at a second time rate of thermal expansion that is greater than the first time rate of thermal expansion of the outer casing. Further included is an inner casing leg configured to separate from an outer casing leg during expansion of the inner casing and configured to engage the outer casing leg during contraction of the inner casing.

According to another aspect of the invention, a clearance control system for a rotary machine includes an inner casing operatively coupled to an outer casing, the inner casing configured to move radially at a first time rate. Also included is a thermal mass operatively coupled to the outer casing and to the inner casing, wherein the thermal mass is configured to contact the inner casing, the inner casing configured to move radially at a second time rate that is slower than the first time rate upon contact with the thermal mass.

According to yet another aspect of the invention, a clearance control system for a turbine system includes an outer casing including an outer casing main portion configured to expand at a first time rate of expansion. Also included is an inner casing disposed between the outer casing and a rotary component of the turbine system, the inner casing configured to expand at a second time rate of expansion that is greater than the first time rate of thermal expansion of the outer casing. Further included is an inner casing leg configured to separate from an outer casing leg during expansion of the inner casing and configured to engage the outer casing leg during contraction of the inner casing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a plot of radial position of the first component and the second component during a startup of the rotary machine;

FIG. 5 is a plot of radial position of the first component and the second component during a shutdown of the rotary machine;

FIG. 6 is a schematic illustration of a clearance control system according to a second embodiment; and FIG. 7 is a schematic illustration of the clearance control system according to a third embodiment.

The detailed description explains embodiments of the invention, together with advantages and features, by way of example with reference to the drawings.

DETAILED DESCRIPTION OF THE INVENTION

Figure 1:
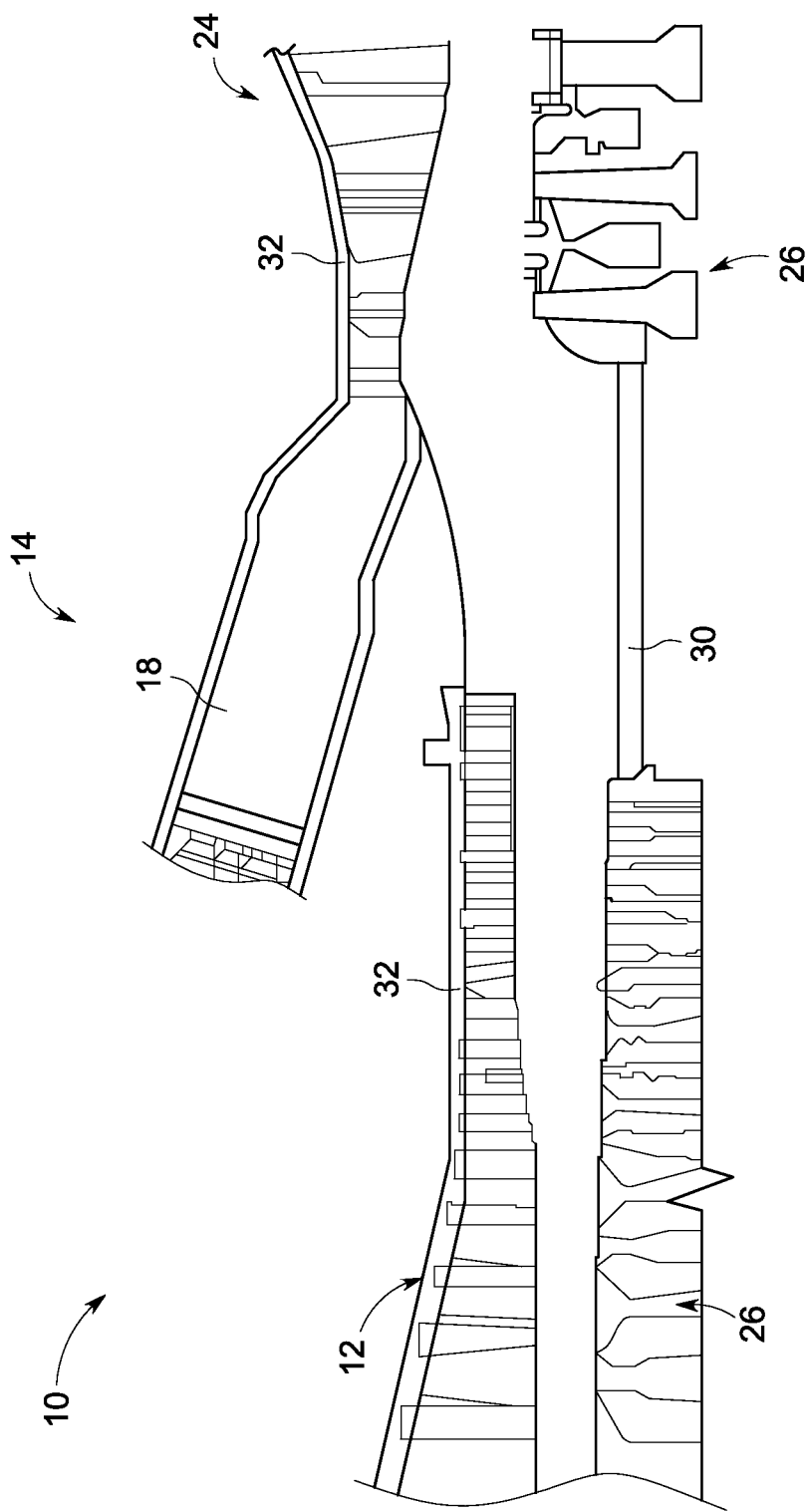
FIG. 1 is a schematic illustration of a rotary machine.

Referring to FIG. 1, a rotary machine 10 constructed in accordance with an exemplary embodiment of the invention, is schematically illustrated. The disclosure herein relates to clearance control techniques that are implemented in the rotary machine. The rotary machine 10 illustrated comprises a turbine-based engine, such as those employed in an aircraft, locomotive, or power generation system. However, it is to be appreciated that alternative embodiments of the rotary machine 10 may benefit from the embodiments of the invention described herein. In particular, as will be understood from the description herein, the gas turbine engine comprises a compressor section 12 and a turbine section 24, but the embodiments described below may be used with simply a standalone compressor, for example.

As used herein, the term "clearance" or the like shall be understood to refer to a spacing or gap that may exist between two or more components of the rotary machine 10 that move relative to one another during operation. The clearance may correspond to an annular gap, a linear gap, a rectangular gap, or any other geometry depending on the system, type of movement, and other various factors, as will be appreciated by those skilled in the art. In one application, the clearance refers to the radial gap or space between housing components surrounding one or more rotating blades of a compressor, a turbine, or the like. By controlling the clearance using the embodiments herein, the amount of leakage between the rotating blades and the housing may be actively reduced to increase operation efficiency, while simultaneously reducing the possibility of a rub (e.g., contact between housing components and the rotating blades). As will be appreciated, the leakage may correspond to any fluid, such as air, steam, combustion gases, and so forth. The terms "rate," "rate of expansion," "rate of contraction," or the like, refer to a time rate of expansion or contraction.

The illustrated embodiment of the rotary machine 10 includes the compressor section 12 and a plurality of combustor assemblies arranged in a can annular array, one of which is indicated at 14. It should be appreciated that this invention is independent of the details of the combustion system, and the can annular system is referenced for purposes of discussion. The fuel and compressed air are passed into a combustion section 18 and ignited to form a high temperature, high pressure combustion product or air stream that is used to drive the turbine section 24. The compressor section 12 and the turbine section 24 each include a rotary portion 26 surrounded by a casing structure 32. The turbine section 24 is operationally connected to the compressor section 12 through a compressor/turbine shaft 30 (also referred to as a rotor). The rotary portion 26 comprises a plurality of rotor blades operatively coupled to the compressor/turbine shaft 30.

Figure 3:
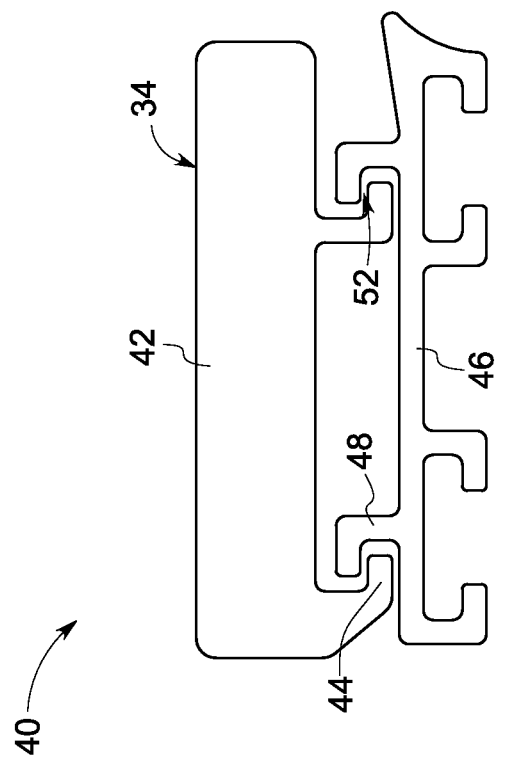
FIG. 3 is a schematic illustration of the casing structure in a disengaged condition according to the first embodiment of FIG. 2.
Figure 2:
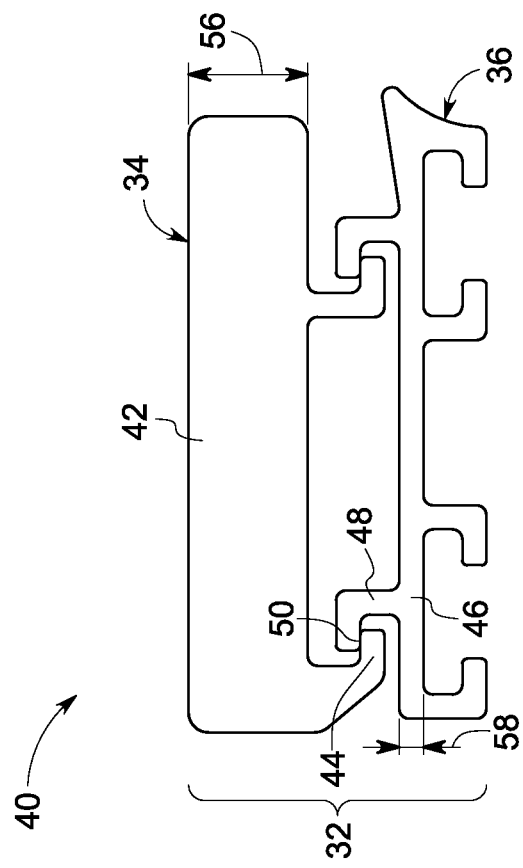
FIG. 2 is a schematic illustration of a first component and a second component of a casing structure in an engaged condition according to a first embodiment of a clearance control system.

Referring to FIGS. 2 and 3, the casing structure 32 is illustrated in greater detail. The casing structure 32 generally refers to a structure that surrounds and at least partially defines an internal region of the turbine section 24 and/or the compressor section 12. The casing structure 32 may be a unitary structure or may be formed of multiple segments. In either event, the casing structure 32 comprises an outer casing 34 and an inner casing 36. Although not illustrated, it is to be appreciated that a shroud structure may be operatively coupled to the inner casing 36 and positioned circumferentially around the rotary portion 26. A clearance control system is employed to avoid potential rubs and excessive radial gaps between the rotor blades and the shroud during operation of the rotary machine 10. In the absence of the clearance control system, the radial gap between the rotor blades and the shroud may increase or decrease due to temperature changes or other factors. For example, as the rotary portion 26 heats up during operation, thermal expansion of the outer casing 34 and the inner casing 36 may cause the shroud to move radially away from the rotational axis of the rotary portion 26, thus increasing the clearance between the rotor blades and the shroud. Such a condition is generally undesirable because combustion gases that bypass the rotor blades via the radial gap are not captured by the blades and are, therefore, not translated into rotational energy. This reduces the efficiency and power output of the rotary machine 10.

A clearance control system 40 according to a first embodiment includes the outer casing 34 and the inner casing 36 and relates to the interaction therebetween, as will be appreciated from the description below. The outer casing 34 comprises an outer casing main portion 42 and at least one outer casing leg 44 extending radially inwardly from the outer casing main portion 42. Similarly, the inner casing 36 comprises an inner casing main portion 46 and at least one inner casing leg 48 extending radially outwardly from the inner casing main portion 46. The outer casing 34 and the inner casing 36 are shown in an engaged condition 50 (FIG. 2) and a separated, or disengaged condition 52 (FIG. 3). The disengaged condition 52 is facilitated by the fact that the outer casing 34 and the inner casing 36 are not fixedly coupled, thereby allowing relative radial motion therebetween. The engaged condition 50 is defined by contact of the at least one outer casing leg 44 and the at least one inner casing leg 48.

As noted above, the outer casing 34 and the inner casing 36 are susceptible to thermal expansion and contraction in response to thermal conditions of the rotary machine 10. Specifically, upon an increase in temperature, the components expand and move radially outwardly, and upon a decrease in temperature, the components contract and move radially inwardly. While it is desirable for the casing structure 32, and particularly the inner casing 36, to move radially outwardly relatively fast during a startup time duration to avoid a rub condition with the rotor blades, a fast contraction response during a shutdown time duration may result in a rub during shutdown or "pinch" upon a subsequent restart of the rotary machine 10. The decoupled configuration of the outer casing 34 and the inner casing 36, wherein the outer casing leg and the inner casing leg are separated for at least a portion of the startup time duration, overcomes the aforementioned issue by providing a relatively fast startup response and a relatively slow shutdown response, as will be appreciated from the description herein.

Referring to FIGS. 4 and 5, with continued reference to FIGS. 2 and 3, respective responses of the outer casing 34 and the inner casing 36 are illustrated. It is to be appreciated that the radial position of each component is not represented, merely the radial responses of each component as a function of time. The outer casing 34 moves radially between a first outer casing position 74 and a second outer casing position 76, while the inner casing 36 moves radially between a first inner casing position 78 and a second inner casing position 80. During a startup time duration 54 (FIG. 4), the inner casing 36 expands and therefore moves radially outwardly at a more rapid time rate than the outer casing 34. This faster time rate of expansion is a result of a thinner inner casing, relative to the outer casing 34. Specifically, the outer casing main portion 42 comprises a first radial thickness 56 that is greater than a second radial thickness 58 of the inner casing main portion 46. The thinner inner casing responds more rapidly to temperature changes of the rotary machine 10, thereby leading to faster responses. This faster time rate of expansion leads to the disengaged condition 52 illustrated in FIG. 3. The time rate of expansion and radial movement of the outer casing 34 is referenced with numeral 60, while the time rate of expansion and radial movement of the inner casing 36 is referenced with numeral 62. The disengaged condition 52 exists for all or a portion of the startup time duration 54. While not necessary, it is contemplated that the outer casing 34 and the inner casing 36 engage one another during a portion of the startup time duration 54 and/or during steady state operation of the rotary machine 10.

As described above, it is also desirable to slow down the response of the casing structure 32, and particularly the inner casing 36, during a shutdown time duration 64. As shown in FIG. 5, the response of the inner casing 36 is constrained by the outer casing 34 during the shutdown time duration 64 as a result of the distinct rates of expansion/contraction. Specifically, the time rate of expansions 60, 62 merge into a single rate of expansion 68 (which is negative during the shutdown sequence) for at least a portion 70 of the shutdown time duration 64. For illustration purposes, a hypothetical unrestrained response of the inner casing 36 is shown with dashed line 72. Due to the distinct radial thickness, the thinner inner casing responds more rapidly to temperature changes of the rotary machine 10, as well as a slower rate of contraction of the outer casing 34. This leads to the engaged condition 50 illustrated in FIG. 2 during the portion 70 of the shutdown time duration 64 discussed above. The engaged condition 50 constrains the contraction and movement radially inwardly of the inner casing 36 in both a mechanical and thermal aspect. Engagement of the at least one outer casing leg 44 and the at least one inner casing leg 48 provides a mechanical restraint that impedes the radial movement of the inner casing 36. Additionally, heat transfer from the outer casing 34 to the inner casing 36 slows the cooling of the inner casing 36, thereby reducing the rate of contraction of the inner casing 36. Both the mechanical and thermal aspects of constraint reduce the inward radial movement of the inner casing 36, which reduces the likelihood of a rub or pinch between the rotor blades of the rotary portion 26 and the surrounding structure, whether a shroud or the inner casing 36, upon a restart of the rotary machine 10.

Although the embodiments described above refer to controlling the time rates of expansion with distinct thicknesses, with respect to the outer casing 34 and the inner casing 36, it is to be appreciated that the time rate of expansion may be controlled in various alternative manners. For example, one or both of the components may be coated or wrapped with a material or substance that manipulates the thermal time rates of expansion or surrounded by a thermal environment that controls the thermal time rates of expansion. However, any suitable control technique may be employed to establish distinct rates of expansion.

Referring to FIG. 6, a clearance control system 100 according to a second embodiment is illustrated. Like reference numerals associated with the first embodiment are employed with description of the second embodiment, where applicable. The clearance control system 100 relies on thermal constraint of the inner casing 36 during the shutdown time duration 64. Specifically, a lever arrangement 102 is employed to operatively couple the inner casing 36, the outer casing 34 and a thermal mass 104. The thermal mass 104 comprises segmented thermal mass components which are actuated into contact with the inner casing 36, as will be apparent from the description below. A first lever 106 is included to generate relative motion between the thermal mass 104 and the inner casing 36. As shown, a first coupling 109 is located proximate a first end 110 of the first lever 106 and supports the thermal mass 104. A second coupling 112 is located proximate a second end 114 of the first lever 106 and couples the first lever 106 to the outer casing 34. A third coupling 116 is located along the first lever 106 at a location between the first coupling 109 and the second coupling 112, but closer in proximity to the second coupling 112. The above-described positioning of the couplings provides desired kinematics of the overall clearance control system 100.

As described above in conjunction with the first embodiment, the inner casing 36 is thinner than the outer casing 34 and responds more rapidly to thermal conditions of the rotary machine 10, wherein the lever is configured to engage the thermal mass and the inner casing during at least a portion of a shutdown time duration. As the temperature increases, the inner casing 36 moves radially outwardly at a more rapid rate than the outer casing 34 and the lever arrangement 102 is configured to impart outward radial movement of the thermal mass 104 during expansion of the inner casing 36. Conversely, as the inner casing 36 contracts and moves radially inwardly at a more rapid rate, relative to the outer casing 34, the inner casing 36 pulls on the first lever 106 and forces the thermal mass 104 into contact and thermal communication with the inner casing 36. During the remainder of the shutdown time duration 64, the thermal mass 104 would be held in contact with inner casing 36 as long as the inner casing 36 is colder than the outer casing 34.

The lever arrangement 102 described above represents a passive actuation of the thermal mass 104, but actuators may be included that are either passively or actively actuated. In an alternative embodiment, an active system actively actuates the thermal mass 104 into contact with the inner casing 36. A controlled actuation device A, such as a solenoid or hydraulic piston—either ganged with a single actuator or with several actuators—around the circumference of the inner casing 36 may be employed. FIG. 7 generally illustrates an embodiment having a plurality of thermal mass segments 120 each configured to communicate with the inner casing 36.

As noted above, FIG. 6 illustrates a passive actuation concept for placing thermal mass 104 into and out of contact with the inner casing 36. Actuation of the thermal mass 104 could be accomplished by other passive or active means including electrical or hydraulic solenoids or other methods. Further, inner casing 36 could be a single wall casing (no separate outer casing). Significantly, the casing (i.e., forming or carrying components that form the flowpath outer wall) includes a heat storage element that it may be separated from or brought into thermal communication with (i.e., contact) to change the temperature and thermal growth of the casing for clearance control purposes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A clearance control system for a rotary machine comprising:
    an outer casing including an outer casing main portion having a first radial thickness, wherein the outer casing is configured to expand at a first time rate of thermal expansion, the outer casing comprising at least outer casing two legs each extending in the same first direction;
    an inner casing disposed between the outer casing and a rotary portion, the inner casing including an inner casing main portion having a second radial thickness that is less than the first radial thickness, wherein the inner casing is configured to expand at a second time rate of thermal expansion that is greater than the first time rate of thermal expansion of the outer casing the inner casing comprising at least inner casing two legs each extending in the same second direction, where the first direction is oppositely oriented and opposed from the second direction; and
    the at least inner casing two legs configured to separate from the at least outer casing two legs during expansion of the inner casing and configured to engage the at least outer casing two legs during contraction of the inner casing.

2. The clearance control system of claim 1, wherein the outer casing and the inner casing are each moveable in a radial direction upon expansion and contraction.

3. The clearance control system of claim 2, wherein the outer casing and the inner casing move radially outwardly during expansion and radially inwardly during contraction.

4. The clearance control system of claim 1, wherein the outer casing is moveable from a first outer casing position to a second outer casing position, wherein the inner casing is moveable from a first inner casing position to a second inner casing position.

5. The clearance control system of claim 4, wherein the outer casing moves from the first outer casing position toward the second outer casing position during a startup time duration, wherein the inner casing moves from the first inner casing position toward the second inner casing position during the startup time duration.

6. The clearance control system of claim 5, wherein the outer casing leg and the inner casing leg are separated for at least a portion of the startup time duration.

7. The clearance control system of claim 4, wherein the outer casing is disposed in the second outer casing position during a steady state time duration, wherein the inner casing is disposed in the second inner casing position during the steady state time duration.

8. The clearance control system of claim 4, wherein the outer casing moves from the second outer casing position toward the first outer casing position during a shutdown time duration, wherein the inner casing moves from the second inner casing position toward the first inner casing position during the shutdown time duration.

9. The clearance control system of claim 8, wherein the at least inner casing two legs and the at least outer casing two legs are engaged during a restrained portion of the shutdown time duration.

10. The clearance control system of claim 9, wherein the restrained portion of the shutdown time duration reduces a time rate of movement of the inner casing.

11. The clearance control system of claim 9, wherein a thermal restraint and a mechanical restraint is imposed on the inner casing during engagement of the at least inner casing two legs and the at least outer casing two legs.

12. A clearance control system for a rotary machine comprising:
an inner casing operatively coupled to an outer casing, the inner casing configured to move radially at a first time rate; and
a thermal mass operatively coupled to the outer casing and to the inner casing, wherein the thermal mass is configured to contact the inner casing, the inner casing configured to move radially at a second time rate that is slower than the first time rate upon contact with the thermal mass.

13. The clearance control system of claim 12, wherein the inner casing and the thermal mass are each operatively coupled to the outer casing with a lever.

14. The clearance control system of claim 12, wherein the inner casing is moveable from a first inner casing position to a second inner casing position.

15. The clearance control system of claim 13, wherein the thermal mass is configured to move radially outwardly upon radially outward movement of the inner casing and to move radially inwardly upon radially inward movement of the inner casing.

16. The clearance control system of claim 15, wherein the lever is configured to engage the thermal mass and the inner casing during at least a portion of a shutdown time duration.

17. The clearance control system of claim 12, wherein the thermal mass is actively controlled by an actuation device for selectively engaging the thermal mass with the inner casing.

* * * * *

UNITED STATES PATENT AND TRADEMARK OFFICE
CERTIFICATE OF CORRECTION

PATENT NO. : 9,488,063 B2  
APPLICATION NO. : 14/025179  
DATED : November 8, 2016  
INVENTOR(S) : Johnson et al.

Page 1 of 1

It is certified that error appears in the above-identified patent and that said Letters Patent is hereby corrected as shown below:

On the title page, item (56), under "U.S. PATENT DOCUMENTS", in Column 2, Line 8, delete "Jr. et al." and insert -- Jr., et al. --, therefor.

Signed and Sealed this
Twentieth Day of December, 2016

Michelle K. Lee
*Director of the United States Patent and Trademark Office*